Figures 1, 2:
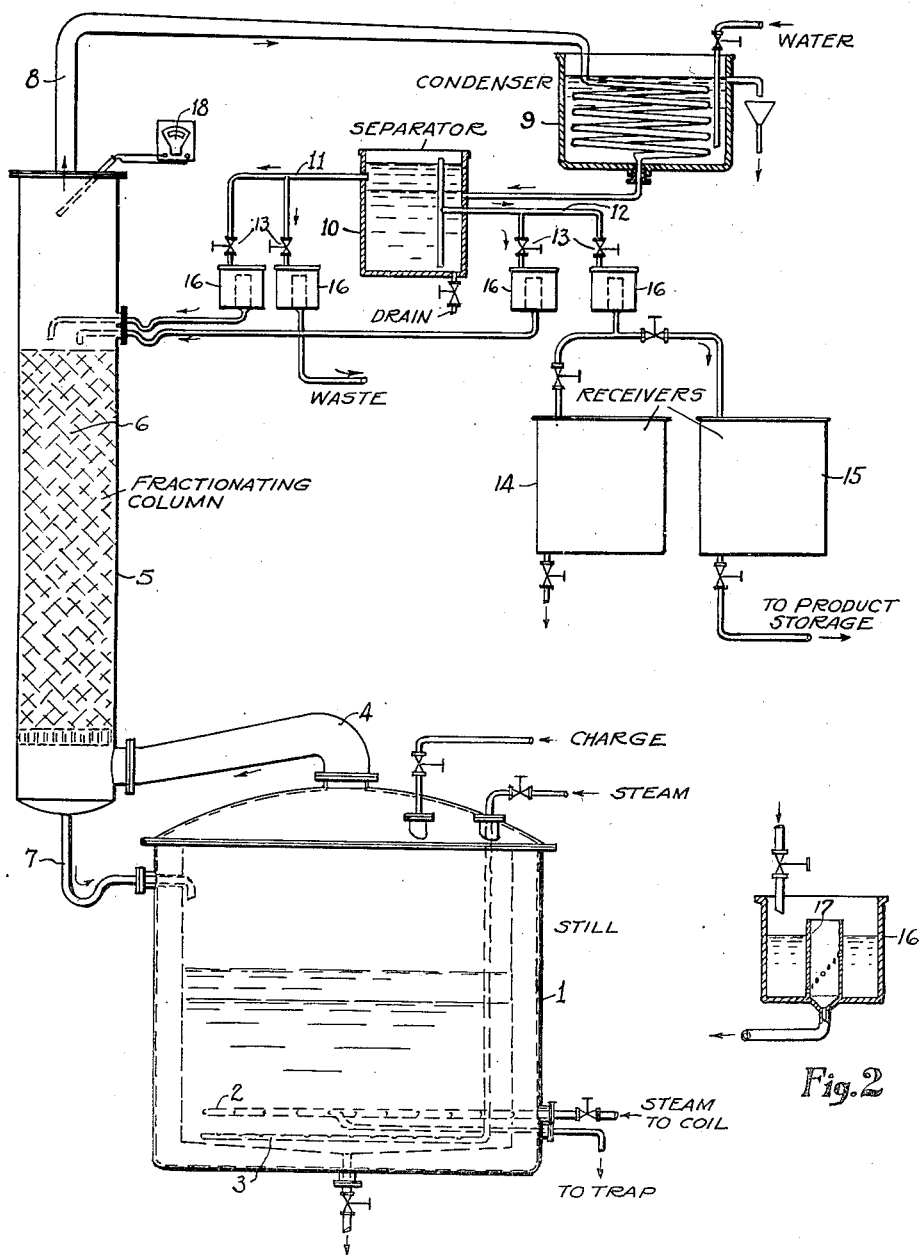

Aug. 8, 1933.  S. B. HEATH ET AL  1,921,157

PURIFYING ETHYLENE DIBROMIDE

Filed Feb. 5, 1931

INVENTORS
Sheldon B. Heath and
BY              Merlin O. Keller
Fay, Oberlin and Fay
ATTORNEYS Patented Aug. 8, 1933

1,921,157

UNITED STATES PATENT OFFICE 1,921,157

PURIFYING ETHYLENE DIBROMIDE

Sheldon B. Heath and Merlin O. Keller, Midland, Mich., assignors to The Dow Chemical Company, Midland, Mich., a Corporation of Michigan Application February 5, 1931. Serial No. 513,512

3 Claims. (Cl. 202—40)

This invention relates to the purification of ethylene dibromide. In the manufacture of the said compound, ethylene is usually reacted directly with bromine under conditions well known in the art. The product so obtained from the commercial raw materials, however, is not pure, but contains a small amount of both high and low-boiling impurities from which it must be separated in order to make a product corresponding to the usual specifications. It has been customary to purify the crude product by steam-distillation, separating the aqueous distillate from the dibromide and drying the latter. The compound purified in this way still contains volatile impurities, which, we have found, cause it to become discolored in storage after a short time. To remove such impurities a second purification consisting in fractional distillation has been resorted to so as to prepare a product of the desired degree of purity.

It is an object of this invention to avoid the expense of the double purification referred to by combining the steam distillation and fractional distillation in a single operation. To the accomplishment of the foregoing and related ends, the invention, then, consists in the steps hereinafter fully described and particularly pointed out in the claims, the annexed drawing and following description setting forth but a few of the various ways in which the principle of the invention may be used.

In said annexed drawing:—

Fig. 1 represents diagrammatically a form of apparatus suitable for carrying out our improved method or process. Fig. 2 shows in enlarged section a detail of the same.

We have found that a very pure ethylene dibromide may be prepared directly from the crude reaction product at a single operation by steam distilling the crude material under fractionating conditions, separating the impurities of lower boiling point from the main body of the distillate and leaving the higher boiling impurities in the still residue. The distillate is divided by stratification into an aqueous layer and a non-aqueous or "oil" layer which are separately recovered.

The operation of our improved method of purification may be best understood by reference to Fig. 1 of the drawing. The crude ethylene dibromide is charged into an enameled or brick-lined still 1, provided with a steam coil 2 and also with a perforated coil or pipe 3 for injecting live steam directly. The charge is first heated to about distilling temperature by means of heat from steam coil 2, and, if desired, a little water is added forming an upper layer in the still, which assists in initiating the distillation. Live steam under any convenient pressure is then admitted through perforated coil 3 and the distillation is started. The vapors formed rise through vapor outlet 4 and pass into the base of fractionating column 5 containing a body of packing material 6 consisting of Raschig rings or the like. The condensed liquid from column 5 is returned to still 1 by a trapped return pipe 7, and the vapors issuing at the top of the column are taken off through vapor pipe 8 leading to a condenser 9 in which the same are cooled and condensed.

The condensate from condenser 9 is conducted to separator 10 in which the segregation of the aqueous and non-aqueous liquids takes place. The upper aqueous layer overflows through pipe 11, while the lower ethylene dibromide layer is taken off through pipe 12. Pipes 11 and 12 are each provided with two branches controlled by valves 13 whereby the flow therethrough may be returned as reflux to the column 5 or drawn off separately. Receivers 14 and 15 are provided for collecting the non-aqueous distillate, while the aqueous distillate may be run to waste.

A simple and convenient means for measuring or proportioning the flow in either branch is shown in detail in Fig. 2. This consists in a cup 16 into which the branch pipe feeds through control valve 13, as shown. The outlet therefrom is formed by a section of pipe 17 introduced through, and rising to a point somewhat above, the bottom of cup 16. Pipe 17 is perforated by a series of small holes at varying heights from the bottom of cup 16, through which liquid can flow. The number of holes submerged, and hence the rate of flow through the outlet, is determined by the liquid level in the cup, which in turn may be maintained as desired by adjusting the feed by means of valve 13. In this way all, or any desired portion, of the flow of either water or dibromide from separator 10 may be at will returned as reflux to column 5 or diverted to a receiver therefor.

At the vapor outlet of column 5 is located a temperature measuring element connected to instrument 18 which serves as a convenient means for indicating the progress of the distillation. In practice a separate check on the distillation is also made by determining the specific gravity of non-aqueous distillate.

When the distillation vapors commence to pass out through pipe 8 the temperature, as shown by instrument 18, may rise at first to about 90° C., but then falls to about 85° C. as the fractional separation of the low-boiling constituents from the ethylene dibromide becomes more complete. The aqueous distillate at this stage is run to waste, while the non-aqueous distillate is refluxed to column 5 until the temperature at the top of the column ceases to fall, indicating that equilibrium between the low-boiling vapors and the dibromide has been reached. Then a portion of the light non-aqueous fraction is diverted to receiver 14 by opening the appropriate valve, while continuing to reflux the remainder thereof. As the distillation proceeds, the light fraction is continuously removed, chiefly in the non-aqueous distillate, although some of the low-boiling compounds are soluble in water and hence are carried away in the aqueous effluent. During this stage the temperature of the vapors gradually rises again to about 90.5° or 90.75°, whereat the specific gravity of the non-aqueous distillate is between 2.168 and 2.175 at 20° C. A this point the distillate consists of ethylene dibromide of high purity. The connection to receiver 14 is then closed and that to receiver 15 is opened, while refluxing of non-aqueous distillate is discontinued. The ethylene dibromide fraction is now taken off and collected in receiver 15 until the vapor temperature at the top of the column rises to approximately 91.25° to 91.5° C. The product is then subjected to a drying treatment with calcium chloride or the equivalent. While this fraction is being distilled all or a part of the aqueous distillate is refluxed to the column, with or without further additions of fresh water. Such procedure is advantageous in maintaining a clean fractionation as well as a close control of the temperature in the column. The water also absorbs small amounts of hydrobromic acid present, which is returned as aqueous acid solution to the still.

After the vapor temperature has risen to 91.25° or 91.5° C. the distillation may be stopped, and the still contents, consisting of high-boiling impurities and aqueous acid solution, discharged. The still may then be recharged with another batch of crude material and the process repeated.

The purified ethylene dibromide distilled in the manner described at column top temperatures between 90.75° and 91.50° has been found, after drying, to distill completely to dryness within a temperature range of 130.7° to 132.9° C. (corr.), and over 95 per cent between 131° and 132° C. The purified product represents approximately 90 per cent of the usual crude material, there being about 5 per cent each of the low-boiling and high-boiling fraction, although the actual proportions of the several fractions will naturally vary more or less according to the quality of the crude material. Among the impurities found in the low-boiling fraction separated are ethylene chlorobromide, ethyl bromide, vinyl bromide, etc. The temperature range within which the purified ethylene dibromide fraction is taken off may be varied slightly from the figures given herein, depending upon the degree of purity desired in the product. In general, however, the range will be between 90.5° and 92° C., preferably 90.75° and 91.5° C., at ordinary atmospheric pressure.

Generally speaking, it has been found preferable in practice to distill crude ethylene dibromide with steam for the purification thereof, since less decomposition of the same takes place at the temperatures and under the conditions involved than when the distillation is carried out with the dry material at normal atmospheric pressure, and, furthermore, such procedure avoids much of the expense and difficulties incident to vacuum distillation of a relatively volatile substance. The herein described procedure, combining the advantages of steam distillation with a fractionation of the vapors, yields a product of highest purity at a single operation and with a minimum of decomposition.

This application is a continuation-in-part of our application Serial No. 300,145, filed August 16, 1928.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of purifying crude ethylene dibromide which comprises steam distilling the same under fractionating conditions and recovering the non-aqueous fraction distilling over at a temperature between 90.5° and 92° C. at atmospheric pressure.

2. The method of purifying crude ethylene dibromide which comprises steam distilling the same under fractionating conditions, separating the aqueous and non-aqueous distillates, removing the non-aqueous fraction distilling at a vapor temperature below 90.5° C., then collecting the non-aqueous fraction distilling between 90.5° and 92° C. consisting substantially of ethylene dibromide, while refluxing the aqueous distillate separated from the latter.

3. The method of purifying crude ethylene dibromide which comprises steam distilling the same under fractionating conditions, separating the aqueous and non-aqueous distillates, removing the non-aqueous fraction distilling at a vapor temperature up to 90.75° C., then collecting the purified ethylene dibromide distilling between 90.75° and 91.5° C., while refluxing the aqueous distillate separated from the latter.

SHELDON B. HEATH.
MERLIN O. KELLER.